Oct. 2, 1962    I. J. SPAETH    3,056,474
RAILWAY BRAKE BEAM CONNECTOR, GUIDE AND SUPPORT
Filed Feb. 16, 1959    2 Sheets-Sheet 1
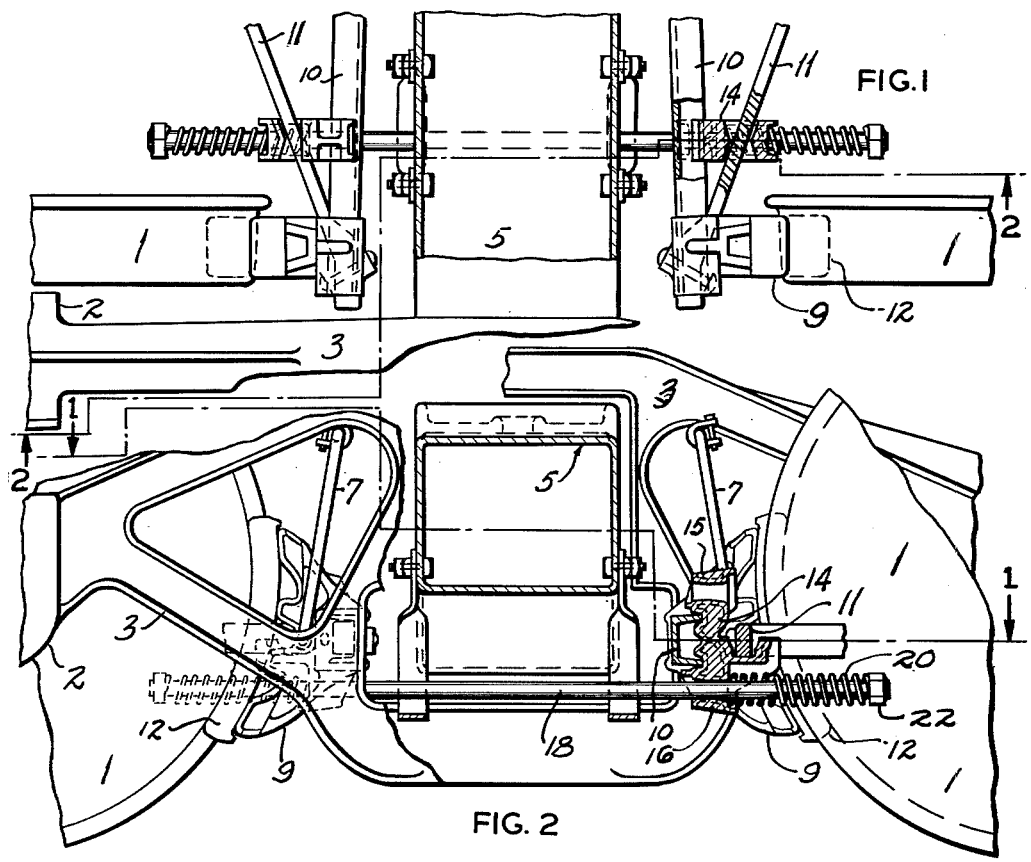
FIG. 1
FIG. 2
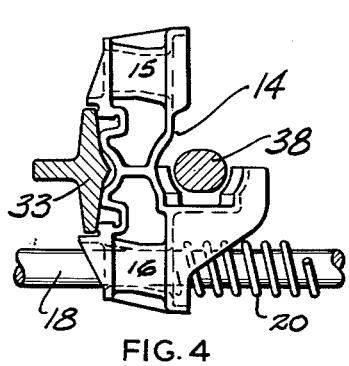
FIG. 4
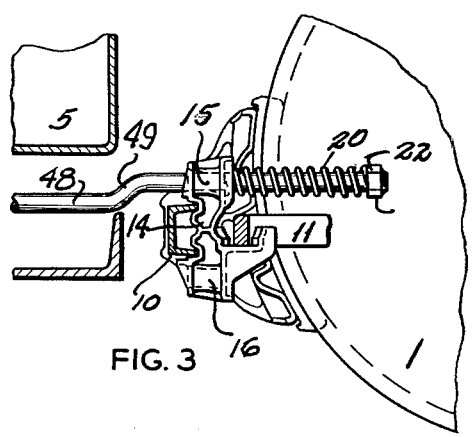
FIG. 3
INVENTOR.
Irvin J. Spaeth
BY Rodney Bedell
atty.

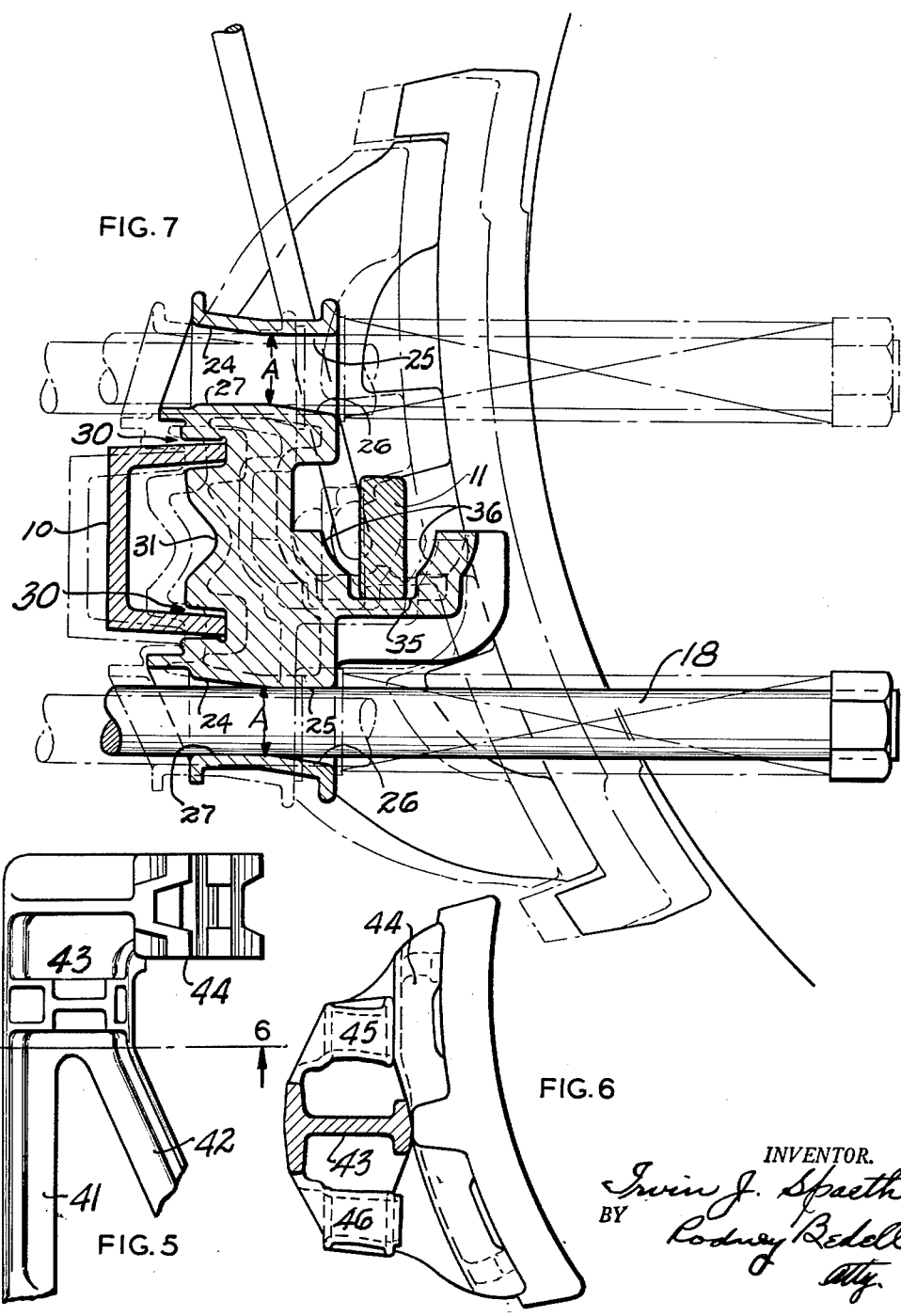

United States Patent Office 3,056,474
Patented Oct. 2, 1962

3,056,474
RAILWAY BRAKE BEAM CONNECTOR, GUIDE AND SUPPORT
Irvin J. Spaeth, Chicago, Ill., assignor, by mesne assignments, to American Seal-Kap Corporation of Delaware, New York, N.Y., a corporation of Delaware
Filed Feb. 16, 1959, Ser. No. 793,551
3 Claims. (Cl. 188—210)

The invention relates to railway rolling stock brake beams of truss type, such as are usually embodied in freight car trucks, and the mounting of the same for guidance during application and release of the brakes and for avoiding the beam falling to the rail in the event of failure of the hanger which normally supports the beam.

More particularly, the invention relates to the beam and mounting arrangement illustrated in United States Patents 1,143,704, and 2,746,576.

One object of the invention is to adapt a brake beam for assembly with an elongated horizontal rod extending between beams at opposite sides of a truck bolster so that the beam may be readily applied to a truck with a spring plank, in which the rod extends over the spring plank, or to a truck without a spring plank, in which the rod passes through stirrups depending from the truck bolster. It is particularly desired that this object be embodied in a beam and rod assembly which does not require separation and reversal of any of the interconnecting beam parts to adapt the beam for spring plank or spring plankless trucks. This makes it possible for the railroad to stock a single form of brake beam at different repair points for mounting on both types of trucks and without requiring disassembly and reassembly of brackets for application to the beam main members.

Hence, it is another object of the invention to effect a beam and beam support structure in which the beam and the rod mounting device may be permanently assembled or formed integrally in a one-piece casting.

It is another object of the invention to adapt a beam device which mounts a safety support rod for selective application to beams having compression and tension members of different cross sections.

In the accompanying drawings illustrating selected forms of the invention:

FIGURE 1 is a top view and horizontal section of one longitudinal half of the central portion of railway truck structure illustrating one form of the invention, the figure being on line 1—1 of FIGURE 2.

FIGURE 2 is a side elevation and vertical section on line 2—2 of FIGURE 1.

FIGURES 1 and 2 illustrate the application of the invention to a truck without a spring plank.

FIGURE 3 corresponds to the right hand portion of FIGURE 2 but illustrates the application of the invention to a truck with a spring plank.

FIGURE 4 corresponds to FIGURE 3 and to the right hand portion of FIGURE 2 but illustrates application of a safety rod mounting bracket to a beam having compression and tension members of different cross sections from those shown in FIGURES 1, 2 and 3.

FIGURE 5 is a plan view of one end portion of a cast metal beam including a safety rod mounting bracket formed integral with the compression and tension members of the beam.

FIGURE 6 is a vertical section on line 6—6 of FIGURE 5.

FIGURE 7 is a section similar to that shown in the right hand portion of FIGURE 2 but is drawn to a larger scale to better illustrate some features of the invention. The figure also shows the safety support rod in broken lines extending over the top of the beam as shown in FIGURE 3.

In FIGURES 1 and 2 the truck wheels are indicated at 1 which will mount the usual axles (not shown) and journal boxes 2 which carry the truck frame indicated at 3. Springs seated on the truck frame support the truck bolster 5. Hangers 7 suspended from the truck frame normally support the brake heads 9 on the ends of the beam compression and tension members 10, 11 converging from the middle of the beam to the ends of the beam. Renewable shoes 12 on the heads engage the wheel treads.

Near each end of each beam is a bracket comprising a body portion 14 and upper and lower projections 15, 16 thereon each forming a passage or sleeve with its axis disposed horizontally and adapted to receive a guide and support rod 18 extending between, through and beyond the beams and mounting compression springs 20 which are compressed between nuts 22 near the outer ends of the rods and opposing faces of brackets 14.

The inner cross section contour of each sleeve, as indicated by the arrow A in FIGURE 7, is circular or egg shape and of a diameter which will slidably receive the rod. The upper inner surface 24 of each sleeve diverges from the sleeve axis from the middle of the sleeve toward one end of the sleeve and the remaining portion 25 is substantially parallel or only slightly inclined to the sleeve axis from the middle of the sleeve toward the other end of the sleeve.

Similarly, the lower inner surface 26 of the sleeve diverges from the sleeve axis from the middle of the sleeve toward the end of the sleeve remote from the diverging surface 24 and the remaining portion 27 of the lower surface of the sleeve is substantially parallel or only slightly inclined to the sleeve axis.

These partially flaring inner surfaces facilitate the insertion of the rod, irrespective of manufacturing tolerances in the milled rods and the cast brackets, and the disalignment of the sleeves at opposite ends of the rod, without materially resisting the sliding of the rod in the bracket, but at the same time maintain the brackets upright and the brake beams horizontal, i.e. parallel to the rail, when the brakes are not applied to the wheels notwithstanding the tendency of the forward or tension member edge of the beam to tilt downwardly by virtue of the unbalanced distribution of the beam weight about its points of pivotal supports on hangers 7.

The rod mounting bracket has one generally upright face, at the left hand side of the bracket shown in FIGURE 7, which is recessed at 30 to receive the edges of the flanges of a beam compression member of channel cross section, and is recessed at 31 to receive the bulge on a beam compression member 33 of T section, as shown in FIGURE 4.

The opposite side of the bracket has a shelf 35 for engaging the underside of the rectangular bar tension member 11, and has arcuate portions 36 at a higher level for engaging the underside of a round rod tension member, as shown at 38 in FIGURE 4. Hence it will appear that the bracket is applicable to a truss type brake beam having the different compression and tension members illustrated.

The beam and bracket assembly is readily adapted for application to a spring plank truck without requiring selection of a specific bracket arrangement or the reversal of a bracket on the beam. As indicated in FIGURE 3, a support guide and safety rod 48 may be applied to the upper sleeve 14 of the bracket, instead of to the lower sleeve 16. Preferably the end portions of the rod will be offset upwardly as indicated at 49 to best accommodate this arrangement without affecting the height of the brake beam 10, 11 or the spring-accommodated downward movement of the bolster 5.

Since the beam and bracket assembly is adapted for both types of trucks, it follows that the bracket and beam compression and tension members may be formed as an integral unit, as illustrated in FIGURES 5 and 6, in which the beam compression and tension members 41 and 42 merge with each other at the end of the beam, as indicated at 43, and the brake head 44 and sleeves 45, 46 are all cast integrally. This eliminates fitting of the bracket to the beam and makes possible a lighter and neater bracket body.

An assembly of the compression member, tension member and brackets could be rendered, in effect, an integral structure by welding the bracket, as shown in FIGURES 1-4, to the compression and tension members.

Other variations in details of the bracket and its assembly could be made without departing from the spirit of the invention and the exclusive use of those modifications coming within the scope of the claims is contemplated.

I claim:

1. In a railway truck brake gear structure, truss type brake beams spaced apart transversely of their length, each having a compression member and a tension member, a unitary bracket mounted on each brake beam between the compression member and tension member and having a sleeve above and a sleeve below the level of said members, the axis of said sleeves being aligned transversely of the beams, an elongated safety rod extending between and past said beams and through corresponding opposite sleeves at the same level, the middle part of each sleeve snugly but slidably fitting the connection rod, each sleeve having an upper inner wall diverging from the rod axis between the sleeve middle part and the end of the sleeve adjacent the beam compression member and each sleeve having a lower inner wall diverging from the rod axis between said middle part and the other end of the sleeve, the remaining parts of the sleeve being substantially parallel to the rod axis and snugly slidable on the rod, whereby the rods while slidable through corresponding opposite sleeves hold the beam tension members against tilting downwardly so that when the brakes are released they do not contact the truck wheel treads.

2. A railway truss type brake beam including a compression member and a tension member, converging from the middle of the beam toward each other near the ends of the beam, a rigid unitary bracket near each end of the beam extending between and seated on said beam tension and compression members, each bracket including a pair of elongated open end sleeves for guide rods, one sleeve above and one below the level of said tension and compression members with the sleeve axes extending transversely of the length of the beam, each of said sleeves having an inner upper wall inclined upwardly of the sleeve axis from the middle of the sleeve toward the end of the sleeve nearer the compression member and extending horizontally from the middle of the sleeve toward the other end of the sleeve, and each of said sleeves having an inner lower wall inclined downwardly of the sleeve axis from the middle of the sleeve toward the end of the sleeve nearer the tension member and extending horizontally from the middle of the sleeve toward the other end of the sleeve.

3. As a new article of manufacture, a railway brake beam one-piece bracket comprising a body with upper and lower projections each provided with a sleeve extending lengthwise of the body for slidably mounting a brake beam guide and support rod, one sleeve having an inner wall part paralleling the sleeve axis for the portion of the sleeve nearer the seat arranged for application to the beam compression member, and the other sleeve having an inner wall part paralleling the sleeve axis for the portion of the sleeve nearer the seat arranged for application to the beam tension member, the opposite end portions of the bracket opening outwardly lengthwise of the bracket and providing seats respectively for the sides of compression and tension members of a truss type brake beam.

References Cited in the file of this patent

UNITED STATES PATENTS

| | | |
|---|---|---|
| 1,037,903 | Harrison | Sept. 10, 1912 |
| 1,126,329 | Williams | Jan. 26, 1915 |
| 1,148,134 | Williams | July 27, 1915 |
| 1,538,280 | Fowler | May 19, 1925 |
| 2,105,998 | Cottrell | Jan. 18, 1938 |
| 2,196,249 | Busse | Apr. 9, 1940 |
| 2,505,974 | Kass | May 2, 1950 |
| 2,746,576 | Lewis et al. | May 22, 1956 |